United States Patent [19]
Lehmann et al.

[11] Patent Number: 5,922,108
[45] Date of Patent: Jul. 13, 1999

[54] METHOD OF REMOVING VOLATILE ORGANOPOLYSILOXANES FROM A FLUID STREAM

[75] Inventors: Robert Gearey Lehmann; Shihe Xu, both of Midland, Mich.

[73] Assignee: Dow Corning Corporation, Midland, Mich.

[21] Appl. No.: 08/827,821

[22] Filed: Apr. 11, 1997

[51] Int. Cl.$^6$ .................................................. B01D 53/04
[52] U.S. Cl. ................................................ 95/141; 95/148
[58] Field of Search ................................ 95/141, 143, 148

[56] References Cited

U.S. PATENT DOCUMENTS

| | | | |
|---|---|---|---|
| 4,421,532 | 12/1983 | Sacchetti et al. | 95/141 |
| 5,346,535 | 9/1994 | Kuznicki et al. | 95/141 |
| 5,389,125 | 2/1995 | Thayer et al. | 95/143 |
| 5,595,586 | 1/1997 | Sivavec | 95/143 |
| 5,695,546 | 12/1997 | Izumi et al. | 95/143 |

OTHER PUBLICATIONS

Environmental Science & Technology, vol. 13, pp. 676–679, 1979.
Environmental Toxicology & Chemistry, vol. 13, No. 7, pp. 1061–1064, 1994.
Environmental Toxicology & Chemistry, vol. 13, No. 11, pp. 1753–1759, 1994.
Environmental Toxicology & Chemistry, vol. 14, No. 8, pp. 1299–1305, 1995.
Environmental Science & Technology, vol. 29, pp. 864–868, 1995.
Environmental Toxicology & Chemistry, vol. 15, No. 9, pp. 1455–1460, 1996.

*Primary Examiner*—Ivars Cintins
*Attorney, Agent, or Firm*—James L. De Cesare

[57] ABSTRACT

A method of removing or recovering a volatile organopolysiloxane such as octamethylcyclotetrasiloxane ($D_4$) from a fluid stream such as air, containing the volatile organopolysiloxane and a hydrocarbon, for example, by adsorbing the volatile organopolysiloxane on dry soil contained in a column, and allowing the remainder of the fluid stream including the hydrocarbon to pass through the column. The dry soil containing the adsorbed volatile organopolysiloxane and any degradation product(s) is then wetted by passing moist air, water, or steam, through the column to desorb, vaporize, and remove the volatile organopolysiloxane from the column. The column containing the wet soil can then be regenerated by air drying the wet soil, and the separating cycle is repeated.

10 Claims, 4 Drawing Sheets

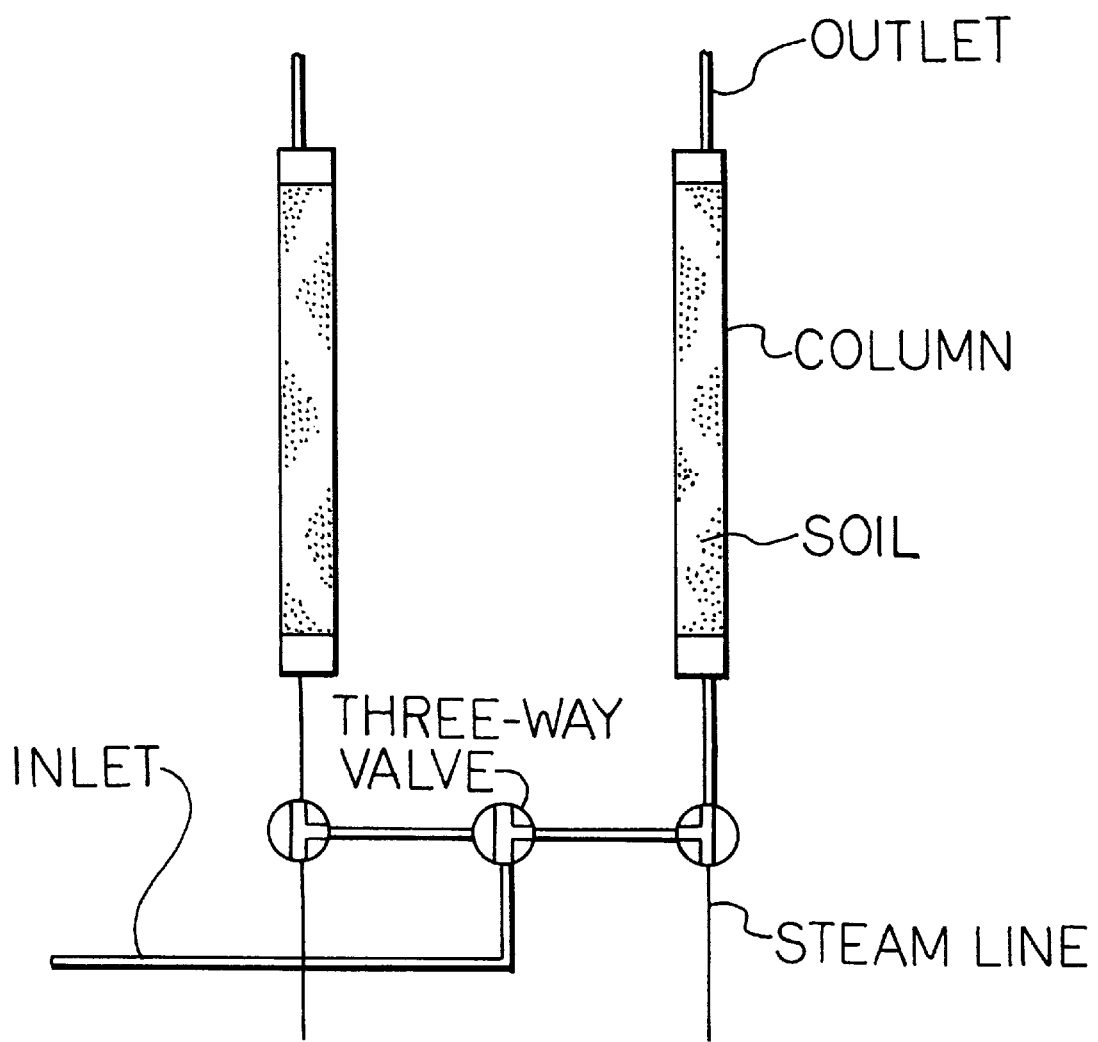

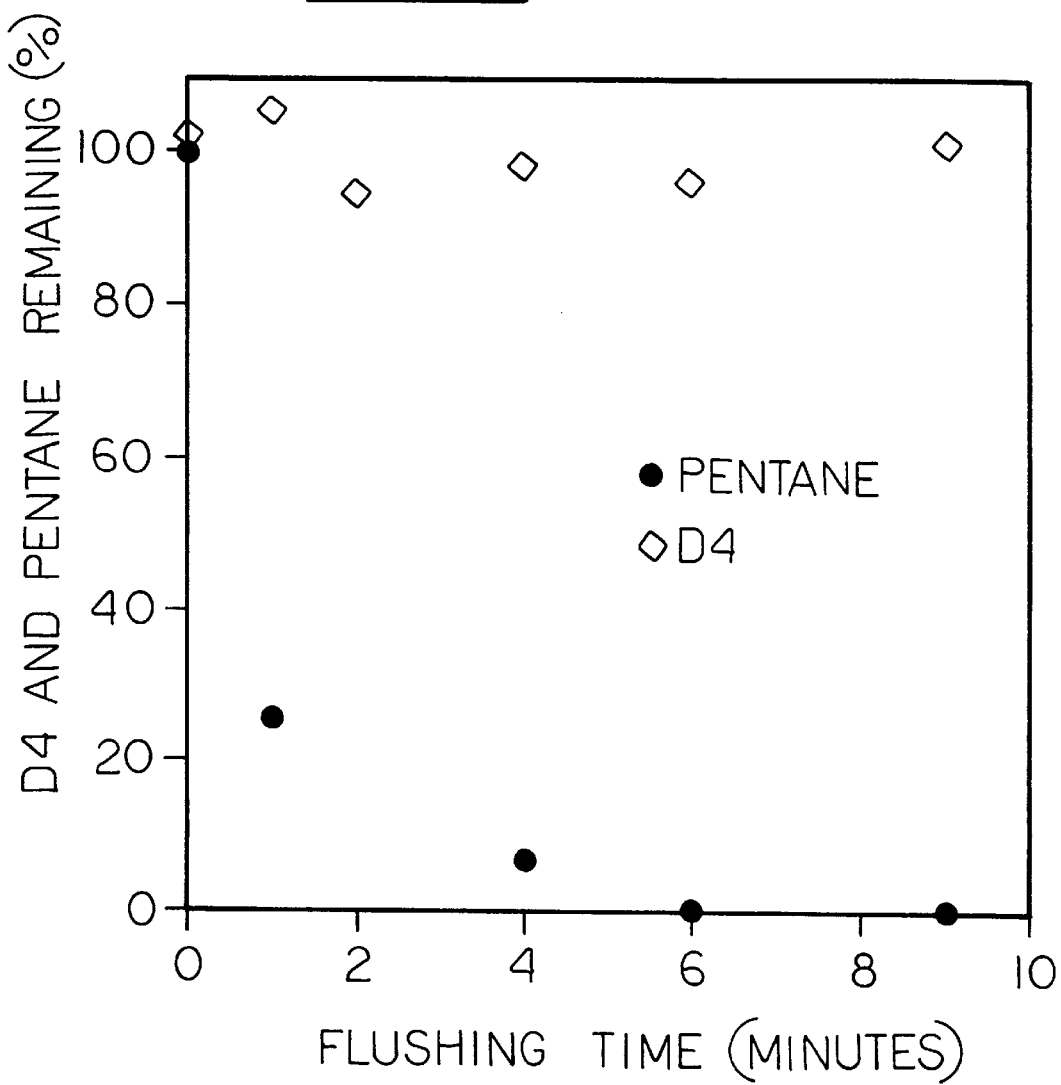

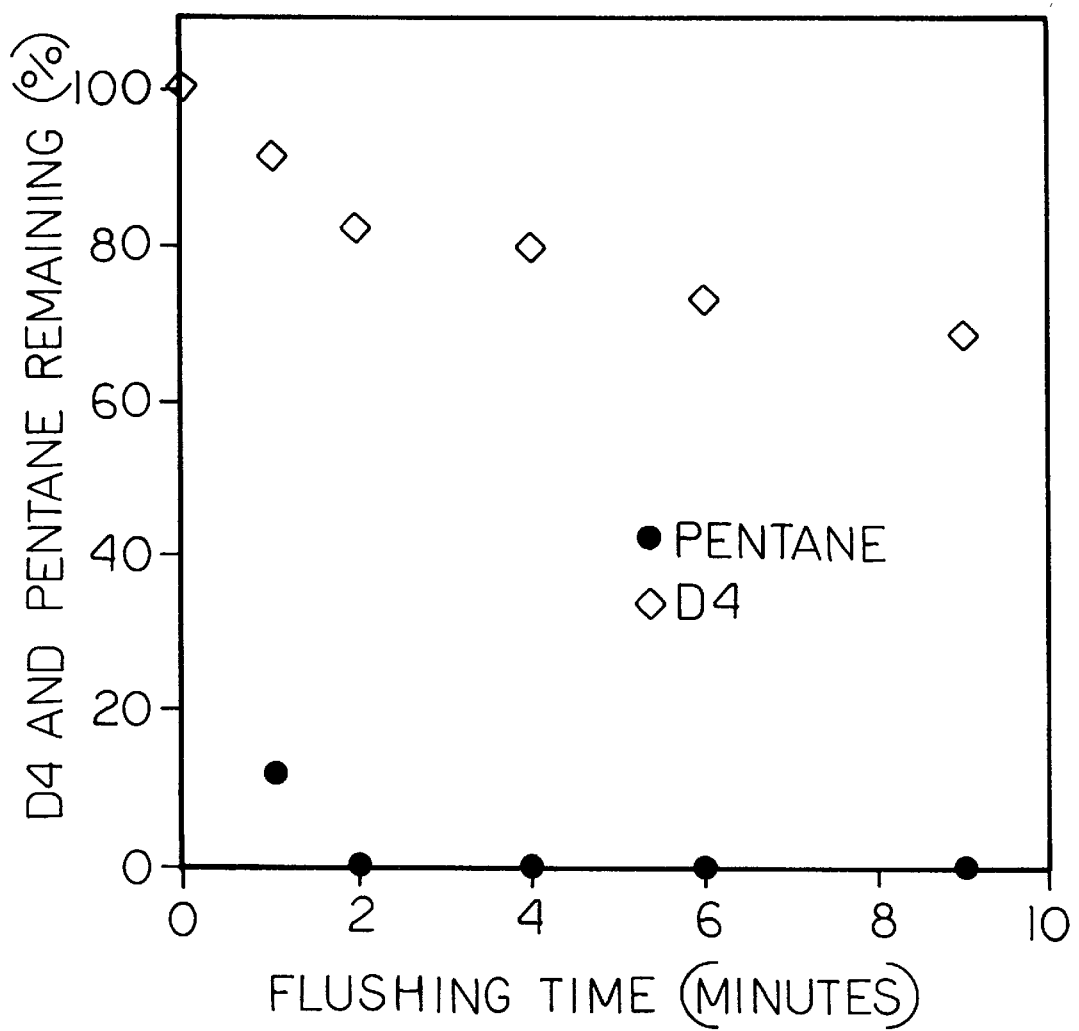

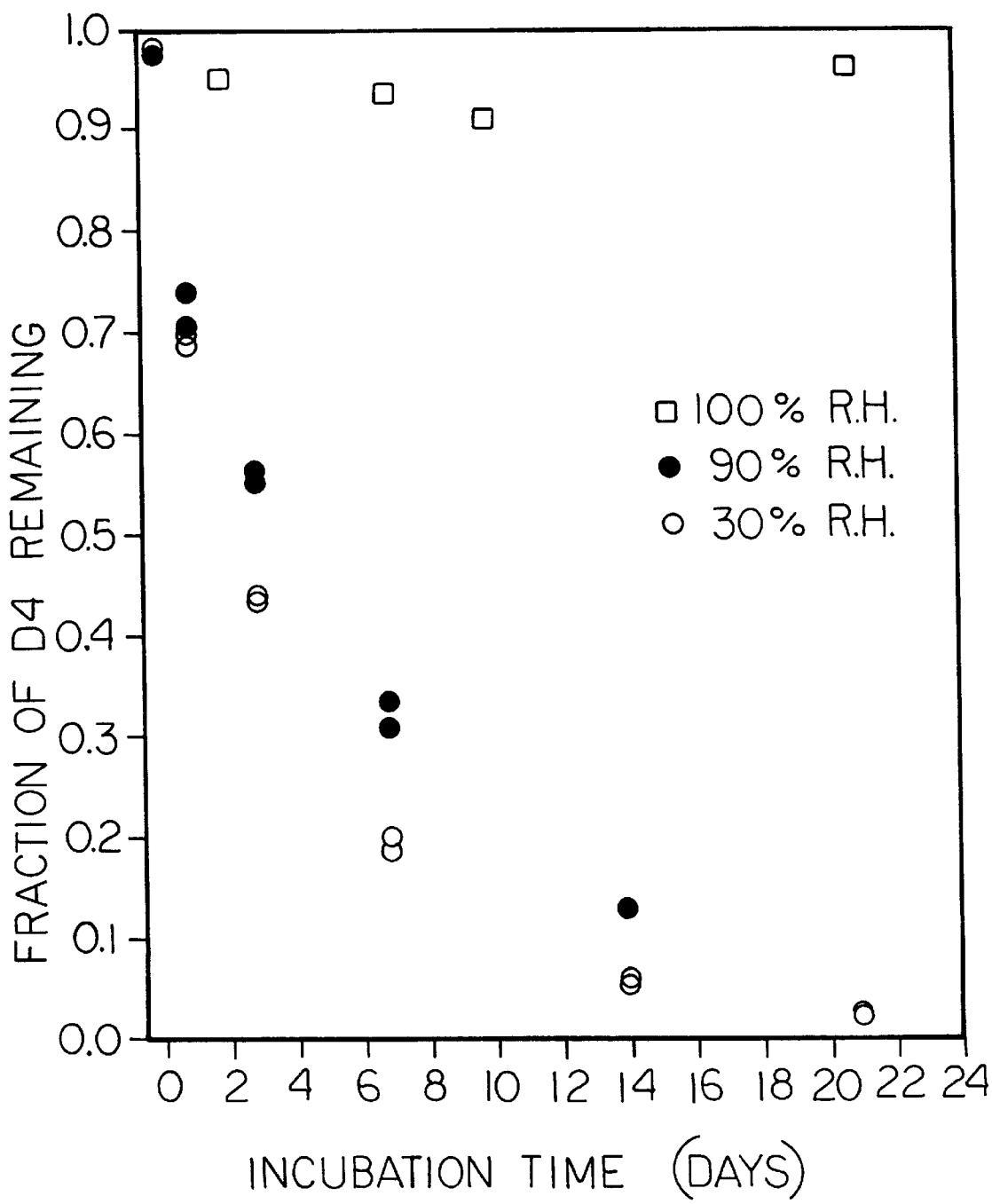

METHOD OF REMOVING VOLATILE ORGANOPOLYSILOXANES FROM A FLUID STREAM

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

This invention relates to a method of recovering or removing volatile organopolysiloxanes from fluid streams in a column containing a soil bed.

Although much has been published concerning the degradation and fate of organopolysiloxanes in the environment, as well as their activity or inactivity on wet and dry soils, no one to our knowledge has applied these learnings, and derived a practical method of separating volatile organopolysiloxanes from fluid streams such as air containing the volatile organopolysiloxanes. See for example, *Environmental Toxicology and Chemistry*, Volume 13, No. 7, Pages 1061–1064, (1994), Volume 13, No. 11, Pages 1753–1759, (1994), Volume 14, No. 8, Pages 1299–1305, (1995); *Environmental Science & Technology*, Volume 13, Pages 676–679, (1979), and Volume 29, No. 4, Pages 864–868, (1995). Such a method would be invaluable, in view of the increased use and presence of volatile organopolysiloxanes in our industrial, commercial, and consumer environments.

Accordingly, we have taken advantage of such learnings including the fact that (i) volatile organopolysiloxanes can be adsorbed on dry soil by virtue of the presence of an induced dipole caused by cations on the clay surfaces of the soil; (ii) volatile organopolysiloxanes are not adsorbed by wet soil because of their hydrophobic nature; (iii) volatile organopolysiloxanes degrade on dry soil as a function of time due to the catalytic action of the clay surfaces of the soil; and (iv) volatile organopolysiloxanes do not degrade at a significant rate on wet soil by virtue of the water present, which functions as a barrier preventing approach of the volatile organopolysiloxane to the catalytic clay surfaces in the soil.

The main degradation product of volatile organopolysiloxanes on dry soil is dimethylsilanediol $(CH_3)_2Si(OH)_2$. There is little or no degradation of volatile organopolysiloxanes to dimethylsilanediol on wet soil, however. Its presence, therefore, is not detrimental according to the purposes of our invention.

This is for the reason that while dimethylsilanediol is water soluble, it is immobile on dry soil, and so it can be removed along with the volatile organopolysiloxane, when a column containing dry soil is flushed with water. In addition, where the objective is to recover as much volatile organopolysiloxane as possible, then it becomes a simple matter of regenerating the soil beds in the column on a more frequent basis, before significant portions of the volatile organopolysiloxane has degraded to dimethylsilanediol. On the other hand, where the objective is to merely remove a volatile organopolysiloxane from a fluid stream, then the soil bed in the column can be regenerated on a less frequent basis, and the degradation of significant portions of the volatile organopolysiloxane to dimethylsilanediol can be tolerated.

BRIEF SUMMARY OF THE INVENTION

Our invention is directed to a method of recovering or removing a volatile organopolysiloxane from a fluid stream. The volatile organopolysiloxane has the formula

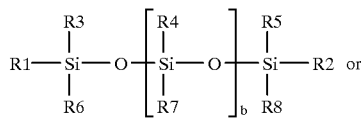

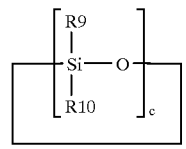

where R1–R10 are alkyl radicals containing 1–6 carbon atoms such as methyl, ethyl, propyl, butyl, pentyl, and hexyl. R1–R10 can also be hydrogen, a hydroxyl group, or an aryl group such as phenyl b is 0–4, and c is 3, 4, 5, or 6. Most preferred are volatile organopolysiloxanes in which R1–R10 are methyl.

The method is carried out by (i) passing the fluid stream through a column packed with dry soil; (ii) adsorbing the volatile organopolysiloxane in the fluid stream onto the dry soil while simultaneously allowing the hydrocarbon in the fluid stream to pass through the column; (iii) desorbing and recovering the volatile organopolysiloxane from the dry soil in the column by passing moist air, water, or steam, through the column to wet the soil; (iv) regenerating the column by passing air through the column to dry the wet soil; and repeating steps (i)–(iii).

These and other objects of our invention will become apparent from a consideration of the detailed description.

BRIEF DESCRIPTION OF THE SEVERAL VIEWS OF THE DRAWING

FIG. 1 is a functional representation of apparatus suitable for carrying out the method of the present invention using a pair of soil columns operating in parallel.

FIG. 2 is a graphical representation illustrating the results of an experiment in which octamethylcyclotetrasiloxane $(D_4)$ was separated from a fluid stream containing air, octamethylcyclotetrasiloxane, and pentane. The graph shows the amount of octamethylcyclotetrasiloxane and pentane that remained in dry soil (i.e., 30 percent relative humidity), after an air dried soil was spiked with octamethylcyclotetrasiloxane and pentane, and then flushed with air at a relative humidity of 30 percent, for periods of time varying from zero to ten minutes. This data was obtained as described in our Example I.

It should be apparent from FIG. 2 that substantially all of the octamethylcyclotetrasiloxane was adsorbed by the dry soil, and that after about six minutes, none of the pentane remained.

FIG. 3 is another graphical representation illustrating the results of the experiment referenced above. The graph shows the amount of octamethylcyclotetrasiloxane and pentane that remained in wet soil (i.e., 100 percent relative humidity), after wet soil was spiked with octamethylcyclotetrasiloxane and pentane, and then flushed with air at a relative humidity of 100 percent, for periods of time varying from zero to ten minutes. This data was also obtained as described in our Example I.

It should be apparent from FIG. 3 that increasing amounts of octamethylcyclotetrasiloxane were desorbed from wet soil over the relatively short period of time (i.e., ten minutes)

that the soil bed was flushed, and that after about two minutes, no pentane remained in the wet soil.

FIG. 4 is an additional graphical representation showing the degradation rate of octamethylcyclotetrasiloxane to dimethylsilanediol, in the presence of Londo soil at three different humidities (i.e., 30, 90, and 100% RH). By degradation is meant the hydrolytic cleavage of siloxane linkages ($\equiv$Si—O—Si$\equiv$) in both cyclic and linear species. Londo soil at a relative humidity of 30 percent is considered dry soil. Londo soil at a relative humidity of 90 percent is also considered dry soil. Londo soil at a relative humidity of 100 percent is considered wet soil. The initial concentration of octamethylcyclotetrasiloxane in each of the three soils was 36 parts per million. This data was obtained as described in our Example II.

It should be apparent from FIG. 4 that the period of time for recovering significant amounts of octamethylcyclotetrasiloxane from a fluid stream using dry soil is relatively short (i.e., no more than about two days), so that if the recovery of octamethylcyclotetrasiloxane is the objective, then its recovery will necessitate a frequent schedule of flushing and regeneration of the soil bed. However, if only the removal of octamethylcyclotetrasiloxane from the fluid stream is the objective, then its removal will necessitate a less frequent schedule (i.e., at intervals of several weeks) of flushing and regeneration of the soil bed.

DETAILED DESCRIPTION OF THE INVENTION

According to our method, volatile organopolysiloxanes, such as octamethylcyclotetrasiloxane ($D_4$), are first adsorbed by dry soil. When the dry soil is then wetted, the volatile organopolysiloxane adsorbed in the dry soil is desorbed, and becomes vaporized. The method can be practiced in any packed column that uses dry soil as a packing material. One advantage of our method is that the packing material is inexpensive and readily available. Another advantage is that the packed column can be regenerated simply by flushing the column with moist air, water, or steam. Flushing the column releases adsorbed volatile organopolysiloxane, causing it to be removed from the column, and regeneration of the column can then be completed by air drying and/or heating the column packing. An additional advantage is that the method can result in the recovery of valuable components of fluid streams, i.e., $D_4$, which can then be reused or recirculated to other commercial or manufacturing processes.

In FIG. 1, we have depicted a system suitable for practicing the method according to our invention, in which there can be seen a pair of Column(s), each containing Soil for removing volatile organopolysiloxanes from a fluid stream. By fluid stream is meant any flowing stream in a gaseous or vaporous state containing volatile organopolysiloxanes, organic compounds, or hydrocarbons. Thus, a fluid stream, such as air containing a volatile organopolysiloxane and a hydrocarbon, i.e., methane or pentane for example, is fed to the Column through an Inlet line.

The fluid stream can be directed to each of the Columns simultaneously, to only one Column, or to neither Column, by manipulation of a Three-Way Valve located in the Inlet line. For example, while one Column is being operated in a recovery mode, the other Column can be in a flushing or regenerating mode. In any case, the fluid stream enters the Column through the Inlet line, and is removed from the Column through an Outlet line located at its opposite end.

Each Column is provided with a Steam Line also controlled by a Three-Way Valve. While the drawing in FIG. 1 shows this line as a Steam Line, the line can be used for introducing moist air or water as well. When it is time to flush the volatile organopolysiloxane adsorbed by the Soil bed from one of the Columns, the Three-Way Valve in the Inlet line is rotated to shut off the supply of the fluid stream to that Column. Steam, moist air, or water is then introduced into that Column by rotating the Three-Way Valve in the Steam Line. The steam, moist air, or water flushes the adsorbed volatile organopolysiloxane from the Soil bed out of the Column and through the Outlet.

After the Soil bed has been flushed with Steam, moist air, or water, and volatile organopolysiloxane has been removed from the Soil bed, air is introduced through the Steam Line to dry and regenerate the wet Soil bed in the Column. The Three-Way Valve in the Inlet line and the Three-Way Valve in the Steam Line are then rotated back to their original positions, and feeding of the fluid stream to the thusly regenerated Column can be resumed once again.

The Columns can be straight, U-shaped, or coiled, and they can have a length of 0.1–10 meters and an inside diameter of 1–200 centimeters. The Columns can be connected serially or they can be operated in parallel. Flow through the Columns can be from the bottom to the top, or vice versa. The Columns can be fed laterally as well. More than two Columns can be used. The Columns can be made of any suitable material such as glass or stainless steel. The Columns can be equipped with an arrangement of valves, pumps, blowers, pressure controllers, vents, heaters, coolers, separators, evaporators, and condensers, necessary to carry out the method in an efficient manner. The temperature and pressure employed in operating the Columns will depend upon the particular fluid stream being treated, but in general, a temperature between 0°–150° C. is suitable for most applications, and pressures above or below atmospheric pressure can be employed to maintain flow through the Columns.

As used herein, the term volatile organopolysiloxane includes, but is not limited to, volatile methyl siloxanes (VMS) which are low viscosity linear and cyclic silicone species corresponding to the average unit formula $(CH_3)_a SiO_{(4-a)/2}$ in which a has an average value of two or three. These organopolysiloxanes contain monofunctional "M" units $(CH_3)_3SiO_{1/2}$ and difunctional "D" units $(CH_3)_2SiO_{2/2}$ joined by $\equiv$Si—O—Si$\equiv$ bonds.

Linear VMS have the formula $(CH_3)_3SiO\{(CH_3)_2SiO\}_x Si(CH_3)_3$ where x has a value of 0–4. Cyclic VMS have the formula $\{(CH_3)_2SiO\}_y$ where y has a value of 3, 4, 5, or 6. Preferably, the volatile methyl siloxane has a boiling point less than about 250° C., and it has a viscosity of about 0.65 to about 5.0 centistokes ($mm^2/s$).

Examples of some representative linear volatile methyl siloxanes are hexamethyldisiloxane (MM) with a boiling point of 100° C., a viscosity of 0.65 $mm^2/s$, and the formula $Me_3SiOSiMe_3$ where Me represents the methyl group; octamethyltrisiloxane (MDM) with a boiling point of 152° C., a viscosity of 1.04 $mm^2/s$, and the formula $Me_3SiOMe_2SiOSiMe_3$; decamethyltetrasiloxane ($MD_2M$) with a boiling point of 194° C., a viscosity of 1.53 $mm^2/s$, and the formula $Me_3SiO(Me_2SiO)_2SiMe_3$; dodecamethylpentasiloxane ($MD_3M$) with a boiling point of 229° C., a viscosity of 2.06 $mm^2/s$, and the formula $Me_3SiO(Me_2SiO)_3SiMe_3$; and tetradecamethylhexasiloxane ($MD_4M$) with a boiling point of 245° C., a viscosity of 2.63 $mm^2/s$, and the formula $Me_3SiO(Me_2SiO)_4SiMe_3$.

Examples of some representative cyclic volatile methyl siloxanes are hexamethylcyclotrisiloxane ($D_3$) which is a solid at room temperature having a boiling point of 134° C. and the formula $\{(Me_2)SiO\}_3$; octamethylcyclotetrasiloxane ($D_4$) with a boiling point of 176° C., a viscosity of 2.3 mm²/s, and the formula $\{(Me_2)SiO\}_4$; decamethylcyclopentasiloxane ($D_5$) with a boiling point of 210° C., a viscosity of 3.87 mm²/s, and the formula $\{(Me_2)SiO\}_5$; and dodecamethylcyclohexasiloxane ($D_6$) with a boiling point of 245° C., a viscosity of 6.62 mm²/s, and the formula $\{(Me_2)SiO\}_6$.

For purposes herein, soil shall be defined as any freely divided, rock derived, and fine grained material, such as clay, silt, sand, rock, gravel, porous rock, shale, or any other material that is naturally deposited upon the earth. Generally, the soil can have a particle size up to about 2 mm, corresponding to US Standard Sieve Numbers up to about 10.

The soil can have any texture between and including sand and clay. The pH of the soil can vary from about 3 to about 9. The organic matter (i.e., humus) content of the soil can vary between zero to about 50 percent.

The soil can contain any combination of clay minerals such as illites, kaolinites, smectites, zeolites, halloysites, and attapulgites; as well as other soil minerals such as quartz, feldspar, mica, vermiculite, chlorite, calcite, dolomite, allophane, hematite, goethite, gibbsite, anatase, pyrolusite, tourmaline, and zircon. A synthetic soil matrix can also be employed, such as SSM soil available from the US Environmental Protection Agency, Washington, D.C., which constitutes a sieved blend containing 20% soil, 20% sand, 25% silt, 5% gravel, 22.5% kaolinite, and 7.5% montmorillonite.

By dry soil is meant an air dried soil that has been obtained by passing air having a relative humidity (RH) of 0–90 percent through the soil.

By wet soil is meant soil that has been obtained by passing air having a relative humidity (RH) of 100 percent through the soil. The term wet soil is also intended to include saturated soil that has been obtained by passing water or steam through the soil.

Generally, 0% relative humidity soil contains about 0.1% water; 20% relative humidity soil contains about 1.5% water; 45% relative humidity soil contains about 2.5% water; and 80% relative humidity soil contains about 4.0% water.

Natural or synthetic clays can be used instead of soil, although it is not as readily available or as inexpensive as soil. By clay is meant any hydrated aluminum silicate such as kaolinite, smectite, attapulgite, vermiculite, chlorite, illite, and halloysite, as well as oxides such as hematite, gibbsite, and goethite.

The following examples are set forth in order to illustrate our invention in more detail. The Londo soil used in these examples is a sandy clay loam obtained in Bay County, Mich., and it is generally representative of Midwestern agricultural soils of intermediate texture. It is a Glossaqualf formed from glacial till under seasonally wet woodlands. In general, Londo soils have an organic matter content of about 2–4 percent; a pH of about 7–8; and a sandy loam or a sandy clay loam texture.

EXAMPLE I

Air dried Londo soil was weighed into several 35 milliliter glass tubes. Each tube contained 5 grams of soil. The tubes were equally divided into two groups. One group of open tubes containing soil was placed in a desiccator. The desiccator contained purified water (i.e., Milli-Q water) in its lower compartment. Another group of open tubes containing soil was placed in a second desiccator. The second desiccator contained a saturated calcium chloride ($CaCl_2$) solution as drying and desiccating agent in its lower compartment. The tubes were left in the two closed desiccators for two weeks, to allow soil moisture to equilibrate with air in the two desiccators. The pre-equilibrated soil samples were each spiked with 0.25 ml of a $^{14}C$-labeled octamethylcyclotetrasiloxane/pentane solution. The tubes were flushed with air at 30 percent relative humidity (dry air) and air at 100 percent relative humidity (wet air), for periods of time varying from 0–9 minutes, using a moisture controlled flushing arrangement. At the end of each flushing period, the tubes were extracted three times with tetrahydrofuran (THF), using 20 ml of THF for each tube each time it was extracted. The $^{14}C$-labeled activity of octamethylcyclotetrasiloxane in the THF extract from each sample was analyzed by Liquid Scintillation Counting. The amount of pentane remaining was determined by Gas Chromatography/Mass Spectrometry (GC/MS). The results of this example are illustrated in drawing in FIGS. 2 and 3, and in Table I below. Where a number does not appear in Table I, a value was not determined.

TABLE I

Retention of D4 and Pentane by Soil at Two Different Humidities

| Flushing Time | Percent D4 and Pentane Remaining in Soil | | | |
|---|---|---|---|---|
| | 30% RH Soil | | 100% RH Soil | |
| (minutes) | D4 | Pentane | D4 | Pentane |
| 0 | 103.1 | 100 | 100.6 | 99.4 |
| 1 | 106.3 | 25.4 | 92.1 | 11.9 |
| 2 | 95.4 | — | 82.5 | 0 |
| 4 | 98.7 | 6.5 | 80.2 | 0 |
| 6 | 96.8 | 0 | 73.3 | 0 |
| 9 | 101.4 | 0 | 68.5 | 0 |

EXAMPLE II

Air dried Londo soil was weighed into several 35 milliliter glass tubes. Each tube contained 5 grams of soil. The tubes were divided into three groups. The first group of open tubes containing soil was placed in a desiccator. The desiccator contained purified water (i.e., Milli-Q water) in its lower compartment. The second group of open tubes containing soil was placed in a second desiccator. The second desiccator contained a saturated potassium hydrogen phosphate ($K_2HPO_4$) solution as drying and desiccating agent in its lower compartment. The third group of open tubes containing soil was placed in a third desiccator. The third desiccator contained a saturated $CaCl_2$ solution as drying and desiccating agent in its lower compartment. The tubes were left in the three closed desiccators for one week, to allow soil moisture to equilibrate with air in the three desiccators. The pre-equilibrated soil samples were each spiked with 0.25 ml of a $^{14}C$-labeled octamethylcyclotetrasiloxane/pentane solution. The tubes were flushed with air at 30 percent relative humidity (dry air), air at 90 percent relative humidity (dry air), and air at 100 percent relative humidity (wet air), for 1–2 minutes, using a moisture controlled flushing arrangement. The tubes were then closed with TEFLON® lined caps and incubated at room temperature for different periods of time ranging from 0–24 days. At the end of each incubation period, two tubes from each moisture group were sequentially extracted three times with hexane, twice with a 0.01 molar calcium chloride solution, and once with 0.1 molar hydrochloric acid. The extracts were qualitatively analyzed by High Performance Liquid Chromatography (HPLC) and GC/MS, to assure that the hexane extracted octamethylcyclotetrasiloxane, and that the calcium chloride and the hydrochloric acid solutions extracted degradation product(s) of octamethylcyclotetrasiloxane (i.e., primarily dimethylsilanediol). The extracts were also analyzed by Liquid Scintillation Counting to quantify the fraction of $^{14}C$ remaining in each extract. Upon completion of all extractions, the soil residue was combusted to determine any non-extractable degradation product(s).

The results of this example are illustrated in the drawing in FIG. 4, and shown below in Table II. Where more than one data point is shown in FIG. 4, this reflects the fact that two tubes from each moisture group were analyzed, as noted above. In Table II, however, the results are shown as an average of two data points where they existed. Where no numbers appear in Table II, these values were not determined.

TABLE II

Degradation of D4 by Soil at Three Different Humidities

| Incubation Time | Percent D4 Remaining in Soil | | |
|---|---|---|---|
| (Days) | 30% RH Soil | 90% RH Soil | 100% RH Soil |
| 0 | 98.4 | 98.1 | — |
| 1 | 69.0 | 72.2 | — |
| 2 | — | — | 95.3 |
| 3 | 43.5 | 55.8 | — |
| 7 | 19.2 | 32.0 | 93.9 |
| 10 | — | — | 91.2 |
| 14 | 5.6 | 12.7 | — |
| 21 | 2.4 | — | 97.1 |

Other variations may be made in the compounds, compositions, and methods described herein without departing from the essential features of our invention. The forms of invention are exemplary only and not intended as limitations on its scope as defined in the appended claims.

We claim:

1. A method of separating a volatile organopolysiloxane from a gaseous or vaporous fluid stream containing the volatile organopolysiloxane and a hydrocarbon, comprising (i) passing the fluid stream through a column packed with dry soil; (ii) adsorbing the volatile organopolysiloxane in the fluid stream in the dry soil while simultaneously allowing the hydrocarbon in the fluid stream to pass through the column; (iii) desorbing and recovering the volatile organopolysiloxane from the dry soil in the column by passing moist air, water, or steam, through the column to wet the soil; (iv) passing air through the wet soil in the column to dry and regenerate the wet soil; and repeating steps (i)–(iii).

2. A method according to claim 1 in which the volatile organopolysiloxane has the formula

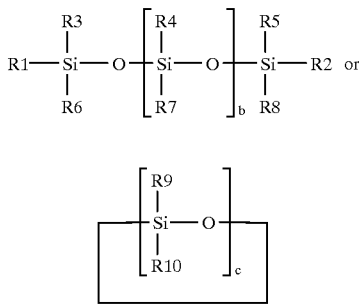

where R1–R10 are an alkyl radical containing 1–6 carbon atoms, hydrogen, hydroxyl, or an aryl group; b is 0–4; and c is 3, 4, 5, or 6.

3. A method according to claim 1 in which the hydrocarbon is methane or pentane.

4. A method according to claim 1 in which the volatile organopolysiloxane is octamethylcyclotetrasiloxane.

5. A method according to claim 1 in which the dry soil in the column is air dried soil obtained by passing air having a relative humidity of 0–90 percent through the soil.

6. A method according to claim 1 in which the wet soil in the column is soil obtained by passing air having a relative humidity of 100 percent through the soil.

7. A method according to claim 1 in which steps (iii) and (iv) are carried out before the degradation of substantial portions of the volatile organopolysiloxane adsorbed in the dry soil to dimethylsilanediol has occurred.

8. A method according to claim 7 in which steps (iii) and (iv) are carried out while at least about 70 percent of the volatile organopolysiloxane remains adsorbed in the dry soil, and less than about 30 percent of the volatile organopolysiloxane has been degraded to dimethylsilanediol.

9. A method according to claim 1 in which steps (iii) and (iv) are carried out following the degradation of substantial portions of the volatile organopolysiloxane adsorbed in the dry soil to dimethylsilanediol.

10. A method according to claim 9 in which steps (iii) and (iv) are carried out while at least about 10 percent of the volatile organopolysiloxane remains adsorbed in the dry soil, and less than about 90 percent of the volatile organopolysiloxane has degraded to dimethylsilanediol.

* * * * *